FIG. 3

Aug. 18, 1953  H. P. VERMILYA  2,648,877
BUILDING CONSTRUCTION
Filed Oct. 23, 1948  9 Sheets-Sheet 5

INVENTOR
Howard P. Vermilya
BY
Donald L. Brown
Attorney

Aug. 18, 1953　　　H. P. VERMILYA　　　2,648,877
BUILDING CONSTRUCTION
Filed Oct. 23, 1948　　　　　　　　　　9 Sheets-Sheet 6

INVENTOR
Howard P. Vermilya
BY
Donald L. Brown
Attorney

Aug. 18, 1953   H. P. VERMILYA   2,648,877
BUILDING CONSTRUCTION
Filed Oct. 23, 1948   9 Sheets-Sheet 7

INVENTOR
Howard P. Vermilya
BY Donald L. Brown
Attorney

Aug. 18, 1953     H. P. VERMILYA     2,648,877
BUILDING CONSTRUCTION

Filed Oct. 23, 1948     9 Sheets-Sheet 8

INVENTOR
Howard P. Vermilya
BY
Donald L. Brown
Attorney

Aug. 18, 1953   H. P. VERMILYA   2,648,877
BUILDING CONSTRUCTION
Filed Oct. 23, 1948   9 Sheets-Sheet 9

INVENTOR
Howard P. Vermilya
BY
Donald L. Brown
Attorney

Patented Aug. 18, 1953

2,648,877

UNITED STATES PATENT OFFICE 2,648,877

BUILDING CONSTRUCTION

Howard P. Vermilya, Princeton, N. J., assignor to American Houses, Inc., New York, N. Y., a corporation of Delaware Application October 23, 1948, Serial No. 56,138

9 Claims. (Cl. 20—2)

This invention relates to housing constructions, and more particularly to a dwelling of the single-family type, for example of two or three levels and equipped with balloon framing, and to elements from which the principal wall- and floor-supporting structure for such a dwelling may be formed.

One object is to provide a novel housing construction whose principal inner and outer wall supports are formed of prefabricated units of sufficient length in their prefabricated form to provide for the entire wall height.

Another object is to provide units of the foregoing type which are simple in construction and design but which can be readily assembled into a permanent, sturdy structure, to provide the frame for inner and outer wall coverings, doors and windows, and to constitute the principal vertical supporting structure of the dwelling.

A further object is to provide a novel housing construction having balloon framing and formed of inner and outer wall units which are capable of fabrication prior to and away from the site of assembly.

Another object is to provide a novel construction and interconnection for floor and wall-supporting elements whereby the same cooperate in assembled condition to provide for the ready attachment thereto of the wall and floor-covering material.

These and other objects of the invention will in part be obvious and will in part appear hereinafter.

The invention accordingly comprises an article of manufacture possessing the features, property and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which.

Referring to the drawings, there is illustrated by way of example one type of dwelling construction embodying a novel supporting framework formed from the novel prefabricated units or panels of the invention. Since the present invention is primarily related to the construction of these inner and outer wall-supporting units or panels, and to the manner in which these panels are interconnected, mounted on a suitable foundation and combined with the floor and roof supports to provide a supporting structure for the walls, floors and roof of a multiple-level dwelling, the details of the space arrangements on the several floor levels have not been illustrated. However, it will be apparent to one skilled in the art from the following that a variety of arrangements are possible.

Figure 1:
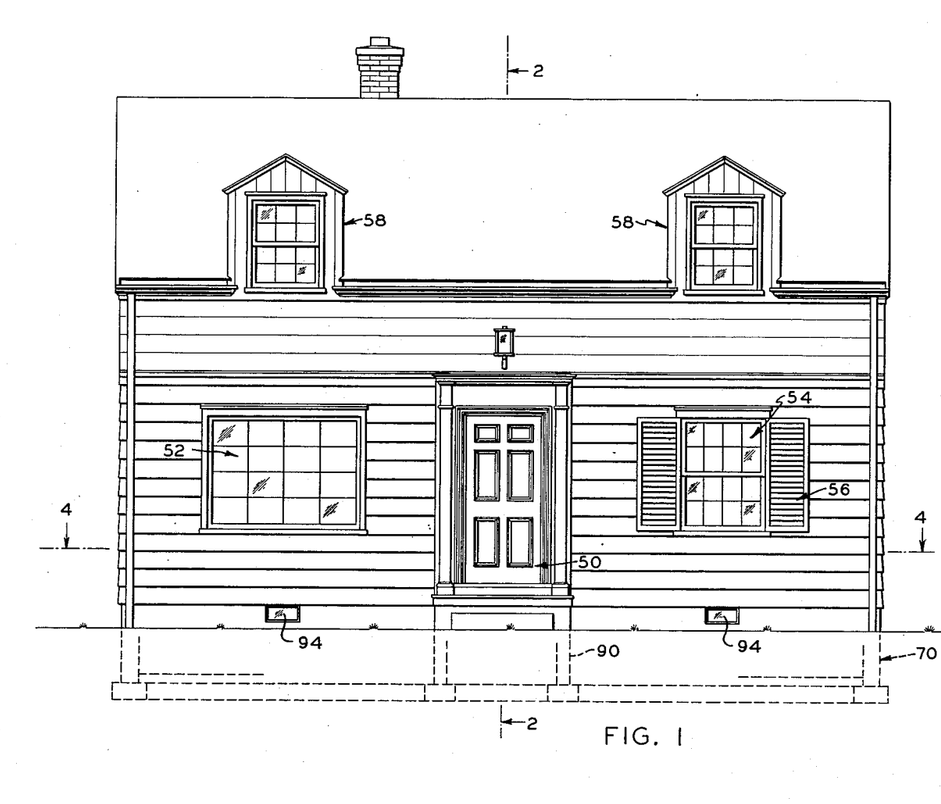
Figure 1 is a front elevation of one type of dwelling which embodies the novel supporting framework of the present invention.

As illustrated in Fig. 1, the external appearance of the house constructed according to the invention may be of conventional design, comprising, for example as viewed in front elevation, a front doorway 50, with windows 52 and 54 on both sides thereof, one of which, for example window 52, being of a fixed sash type and the other a conventional movable sash type provided with slat blinds 56. Dormer windows 58 are provided in the illustrated embodiment and are shown symmetrically arranged on opposite sides of the center line of the house. The outer wall covering may be brick veneer, clapboards or, as shown, asbestos shingles. The outer roof covering may also be of any of the usual roof-covering materials such as asphalt shingles.

The house, as illustrated, is generally rectangular in plan (Fig. 4) with the long dimension paralleling the front thereof, but it is to be understood that the wall units hereinafter described may be assembled as desired to provide other arrangements in plan.

In the preferred form of the present invention there is provided an internal wall-supporting structure 60 (Figs. 2, 3 and 4) which, as shown, extends substantially parallel to the front and rear walls 62 and 64 and abuts the side walls 66 and 68 (Fig. 4) at about the mid-centers thereof, splitting the interior of the dwelling into two horizontally spaced areas. Each of said areas on opposite sides of central wall 60 is provided with a plurality of levels and each said level is vertically displaced with respect to the levels on the other side of said central wall. In the preferred form the levels on one side of the house are spaced approximately a half-story with respect to the levels on the other side of the house.

A foundation wall 70 (Figs. 2, 3 and 4), for example of brick or masonry or other suitable material for this purpose which may include a footing 70a below the frost line, provides the foundation for the structure of the present invention and, in the form shown, comprises outer supporting portions 72, 74, 76 and 78 (Fig. 4) for walls 62, 64, 66 and 68, respectively, and also an inner supporting portion 80 for the inner wall 60. That part of the foundation to the rear of central portion 80 (Fig. 3) is suitably excavated and is preferably provided with a masonry or other flooring 82. This constitutes the basement level and is entered from the rear of the dwelling by means of a door 84 which is reached by a stairway 86 formed preferably of the same materials as the foundation walls. Approximately a half-story above floor 82 of the basement level on the other side of wall 60 is the floor 92 of the first level which may be reached from the basement by a stairway 87 (Fig. 3) and may be entered directly from the exterior, for example, by the central doorway 50 (Fig. 2), a suitable entryway 88 being provided for this purpose and being supported on a portion 90 of the foundation which projects forwardly of portion 72. The area beneath floor 92 of this first level need only be partly excavated and the space thus provided beneath said floor may be ventilated by suitable vents 94 provided, for example, in the upper portions of foundation wall 72.

The first level connects, by a stairway 96, to a second level whose flooring 98 (Fig. 3) is directly over basement flooring 82, and this second level is in turn connected by a stairway 100 with the third floor level 102 (Fig. 2), ventilated and lighted by dormer windows 58. Space 104 (Fig. 3) above the ceiling of the second level, which may be reached from the third level, may, if desired, serve as a utility storage space. It is possible, for example, in utilizing these various floor areas to provide on the second and third level a plurality of bedrooms and one or more bathrooms, and the first level may contain the living, dining and kitchen areas, or any suitable combination thereof. However, as hereinbefore pointed out, the arrangement of the various rooms on the several levels does not constitute a part of the present invention and the latter is not to be construed as being limited to any specific arrangement.

Each of walls 60, 62, 64, 66 and 68 is formed of a plurality of novel panels or units which, as hereinbefore pointed out, can be readily prefabricated away from the site of assembly and each of which, in its prefabricated form, extends substantially the height of the wall of which it forms a part. Accordingly, the panels of outer walls 62 and 64 are approximately a story and a half in height and have their lower ends secured to sills 106 (Figs. 2 and 3) which are suitably affixed to the foundation walls. At their upper ends said wall panels have beams or plates 108 secured thereto, which plates extend the length of each of said front and rear walls. Each of plates 108 is suitably dadoed for receiving and mounting the lower ends of a plurality of roof rafters 110. At their upper ends rafters 110 connect with a ridge member 112 and each pair of said rafters on opposite sides of said ridge member are connected by a suitable tie-member 114. The panels for side walls 66 and 68 are also approximately a story and a half in height and are generally similar in construction to the panels of the front and rear walls. These side wall panels also rest on sills affixed to the upper ends of the foundation walls and a pair of beams, one on each side of the building, are secured to the upper ends of said side wall panels. A suitable gable member is mounted upon said side wall beams to provide the wall area between said beams and the roof.

The panels of central wall 60 (Fig. 2) are approximately two stories in height and rest upon a sill 116, secured to the upper end of the foundation portion 80. At their upper ends said panels are provided with a pair of superposed beams 118, the upper one of which abuts and supports the tie-members 114.

Figure 5:
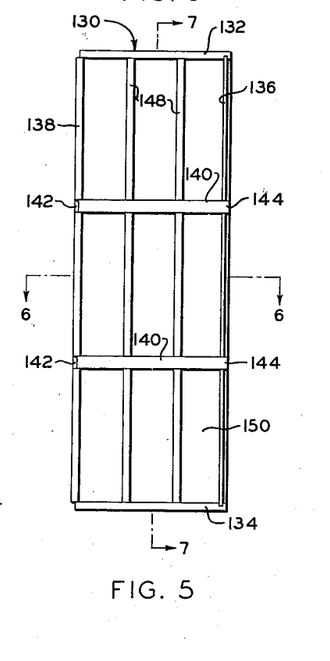
Fig. 5 is a view in front elevation of one of the outer wall panels.
Figure 6:
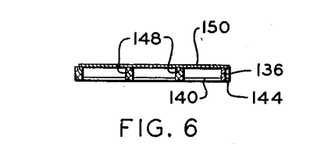
Fig. 6 is a horizontal section taken along line 6—6 of Fig. 5.
Figure 7:
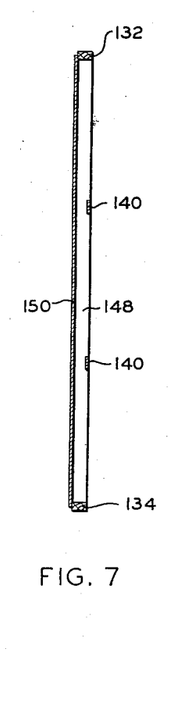
Fig. 7 is a vertical section taken along line 7—7 of Fig. 5.

Referring now to Figs. 5, 6 and 7 of the drawings, there is shown a wall panel 130 of the outer wall framework. Panel 130 embodies certain features which are common to various other inner and outer wall panels and which adapt said panels for ready assembly and interconnection, said common features being embodied in the outer frames of said panels. As shown, the outer frame of panel 130 comprises a pair of horizontal crosspieces 132 and 134 of similar construction dadoed adjacent their right-hand edges, as viewed in Fig. 5, to provide a pair of grooves for receiving a vertical stud 136. At the other side of the panel frame a stud 138 abuts the ends of each of said crosspieces 132 and 134 and, in the preferred form of the panel, stud 138 projects edgewise beyond the end of each of crosspieces 132 and 134 by a distance which is approximately equal to the distance which separates the outer face of stud 136 and the corresponding end of crosspieces 132 and 134. It is also preferable that stud 136 be narrower than stud 138, for example half the thickness of the latter stud.

A pair of horizontal strips 140, for example of plywood, each preferably vertically spaced an equal distance from the other and from the adjacent one of crosspieces 132 and 134, are secured to the inner face of the panel and are preferably the same length as said crosspieces and in vertical alignment therewith. To receive these strips each of studs 138 and 136 is suitably dadoed and since the panels are aligned with the crosspieces there remains unfilled by said strips, at the left-hand side of the panel as viewed in Fig. 5, i. e. in stud 138, a pair of grooves 142, and there is provided at the right-hand side of the panel, extending beyond stud 136, a pair of tongues 144.

Figure 4:
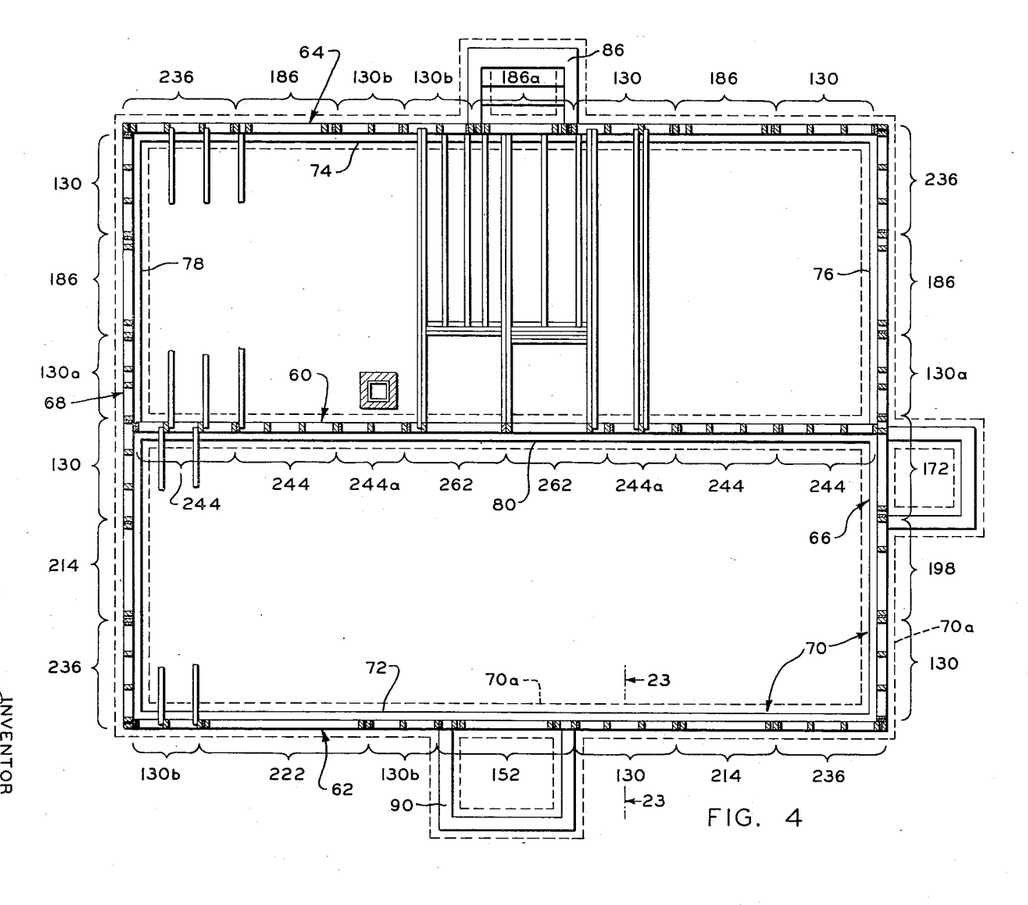
Fig. 4 is a sectional view taken substantially in a horizontal plane along line 4—4 of Fig. 1, showing the foundation and the arrangement of the outer and inner wall panels on said foundation and also including some of the floor joists.

To provide further constructional reinforcement of the panel, one or more intermediate studs 148 may constitute a part of the panel, being horizontally spaced with respect to outer studs 136 and 138. Depending on the width of the panel, one or more of said intermediate studs 148 may be provided. As shown in Fig. 4, at least one panel, exactly like panel 130 of Fig. 5, constitutes a part of the supporting framework of each of outer walls 62, 64, 66 and 68. Somewhat narrower panels, of the same general construction and differing from panels 130 only by the spacing of their two intermediate studs 148, are shown at 130a, one such panel being provided in each of side walls 66 and 68. A still further panel, like panel 130 but approximately two-thirds the width of said panel, is shown at 130b in front and rear walls 62 and 64, said panels 130b being provided with but a single intermediate stud 148.

The outer surface of each of these wall panels has applied thereto suitable covering material of a kind imparting further structural strength and rigidity to said panels, for example sheets 150 of plywood, these sheets being so arranged as to be aligned horizontally with upper and lower crosspieces 132 and 134 so that the same also extend on one side of the panel beyond vertical stud 136 and on the other side do not extend so far as the edge of vertical stud 138.

Figure 8:
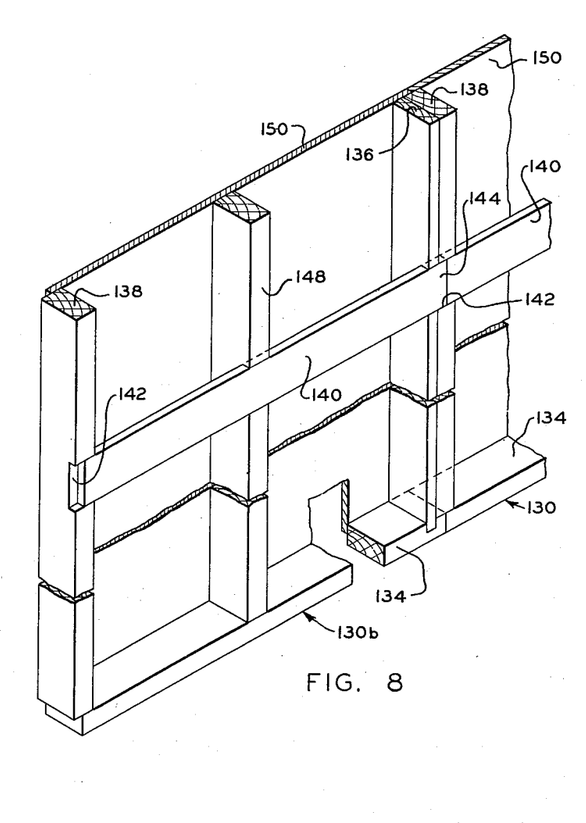
Fig. 8 is a fragmentary, perspective view, with parts broken away, showing two of the wall panels in assembled relationship.

The assembly of two panels, for example a panel like 130b and a panel 130, is illustrated in Fig. 8. As shown, vertical stud 136 of panel 130b abuts and is secured to vertical stud 138 of panel 130. Thus, the upper and lower crosspieces of panel 130b (only lower crosspieces 134 being shown in Fig. 8) overlap and abut the ends of stud 138 of panel 130. Similarly, the tongues 144 of the plywood strips 140 of panel 130b fit into and are received by grooves 142 in stud 138 of panel 130. The vertical edges of plywood sheets 150 of the two panels also abut one another with the sheet of panel 130b overlapping stud 138 of panel 130.

It will now be apparent that the above-described interlocking of the panels is the result of the construction of the outer frame of the panel, namely, the arrangement of upper and lower horizontal crosspieces 132 and 134, vertical studs 136 and 138, and grooves 142 and tongues 144. Any panel of similar height, regardless of the interior construction thereof, which is provided with a similar outer frame, will interlock with another of said panels in the foregoing manner to provide a sturdy rigid framework for the walls of the dwelling. Accordingly, in the following description of the various other forms of panels which are interconnected to provide the outer walls of the dwelling, where the outer frame of the panel is similar to that of panels 130, 130a and 130b, it is identified with the same numerals. It is to be understood also that such plywood sheeting 150 as is applied to the outer surfaces of said panels is related, wherever applied, to the outer studs 136 and 138 in the same manner as in panel 130.

Figure 9:
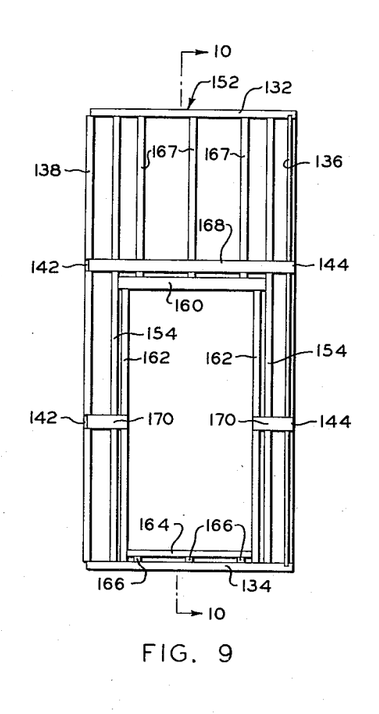
Fig. 9 is a view, similar to Fig. 5, of a type of wall panel which is adapted to receive and mount a door, for example the front door of the dwelling.
Figure 10:
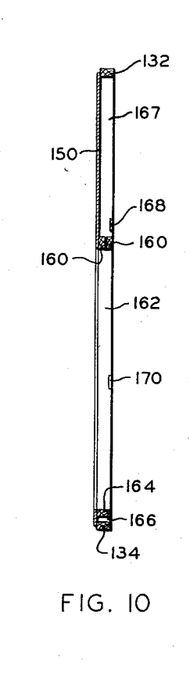
Fig. 10 is a vertical section taken substantially along line 10—10 of Fig. 9.

Within their outer frame, the structure of the panels hereinafter described varies according to their location in the dwelling and the function the panels perform. For example, to provide that portion of the outer wall which includes central doorway 50, a panel 152 (Figs. 9 and 10) may be used which has a pair of vertical studs 154 abutting crosspieces 132 and 134, each said stud being spaced a short distance from the adjacent one of outer studs 136 and 138. Between studs 154 there is mounted a pair of horizontal cross-beams 160 which provide the frame for the upper edge of the door. A pair of vertical studs 162 abut cross-beams 160 at their upper ends and extend down to and abut crosspiece 134 at their lower ends. Adjacent their lower ends there extends between studs 162 a cross-beam 164 and a plurality of blocks 166 connect said cross-beam 164 with crosspiece 134 to provide further supports for said cross-beam. A plurality of short vertical studs 167 are mounted between upper crosspiece 132 and cross-beams 160. To provide upper tongue 144 and to define the inner wall of upper groove 142 a single strip of plywood 168 extends from stud 138 to stud 136. A pair of plywood strips 170, one on each side of the door frame and extending from each of studs 162 to the adjacent one of studs 136 and 138, provide the lower tongue 144 and serve to define lower groove 142.

Figure 11:
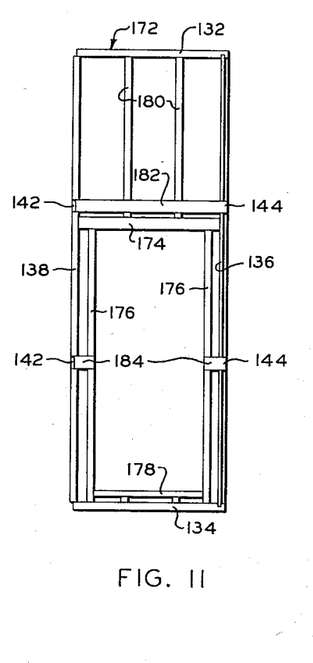
Fig. 11 is a view, similar to Fig. 5, of another type of panel which provides for a door, for example the side door of the dwelling.

A panel 172, somewhat similar to panel 152 but of a lesser width, is shown in Fig. 11. It provides a supporting structure for that portion of the side wall which contains a door, the door-receiving area of said panel being defined by a pair of horizontally spaced, horizontal cross bars 174, a pair of vertical studs 176, and a lower cross-beam 178. A pair of short vertical studs 180 abut cross-beams 174 at their lower ends and crosspiece 132 at their upper ends. A long plywood strip 182 and a pair of shorter strips 184 provide tongues 144 and serve to define the ends of grooves 142. Cross-beams 174 and 178, together with vertical studs 176, provide the framework for mounting the door.

Figure 12:
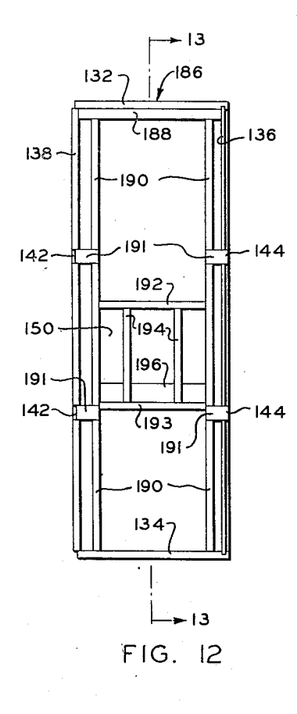
Fig. 12 is a view, similar to Fig. 5, of still another type of wall panel which is so constructed as to mount windows on two levels of the dwelling.
Figure 13:
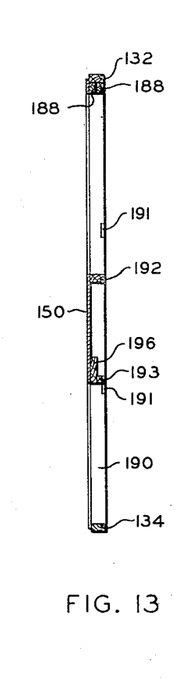
Fig. 13 is a sectional view taken along line 13—13 of Fig. 12.

A further modification of the novel panel construction of the invention, wherein windows may be mounted to provide a window on each of two levels, is shown in Figs. 12 and 13 as panel 186, Said panel 186 comprises, in addition to the outer frame, a pair of horizontal cross-beams 188 which abut the upper crosspiece 132 and extend between studs 136 and 138, and a pair of vertical studs 190 which are spaced apart a sufficient distance to receive the window frames and which extend from cross-beams 188 to lower crosspiece 134. Studs 190 are dadoed to receive four short plywood strips 191 which extend from said studs to the adjacent one of studs 136 and 138 and provide tongues 144 and define the ends of grooves 142. A pair of vertically spaced cross-beams 192, 193 define the lower and upper edges of the window areas of the upper and lower windows, respectively. Between cross-beams 192 and 193 there extend a pair of short vertical studs 194 which are dadoed at their lower ends to receive a crossplate 196, which crossplate abuts crossbeam 193 and has the lower edge thereof flush with the lower edge of cross-beam 193. Crossplate 196 is securely nailed, or otherwise affixed, to each of studs 194 and 190. Each of said studs and said crosspiece is in turn secured by suitable fastening means, such as nails, to the plywood sheeting 150 to provide a rigid and strong supporting structure.

One of panels 186 is shown (Fig. 4) as comprising a part of the structure of each of side walls 66 and 68 and defines window areas in the basement and second level on both sides of the dwelling. Two panels 186 are also provided in the rear wall 64 of the dwelling, providing a pair of rear windows on opposite sides of the rear door in each of the basement and second levels. A panel construction, differing somewhat in the size of its upper window area but otherwise of the same general construction as panel 186, is provided at the rear of the dwelling at 186a—the location of the rear door—and, when in this position, lower crosspiece 134 of this panel is cut between studs 190 so that the resulting lower open area of the panel defines the upper frame for the rear door 84.

Figure 14:
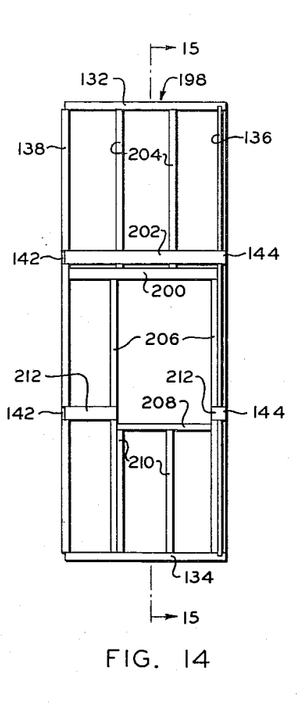
Fig. 14 is a view, like Fig. 5, of a modification of the wall panel of Fig. 12 which is adapted to mount a single window on a lower level.
Figure 15:
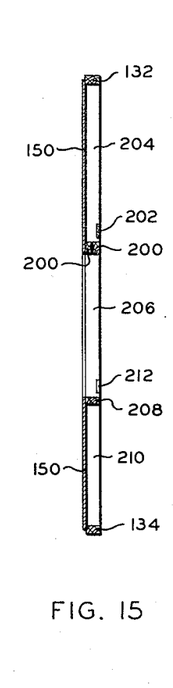
Fig. 15 is a sectional view taken substantially along line 15—15 of Fig. 14.

To provide a window in side wall 66 on the first level there is provided a further panel 198 (shown in Figs. 14 and 15) which comprises a pair of horizontal cross-beams 200 extending between studs 138 and 136, just below the location of a plywood strip 202 which fits into the upper dadoes in said studs and provides upper tongue 144 and defines the inner wall of upper groove 142. A pair of short vertical studs 204 are secured at their upper ends to crosspiece 132 and at their lower ends to cross-beams 200, being suitably dadoed to receive strip 202. A pair of studs 206, spaced apart a distance equal to the window area, are secured at their upper ends to cross-beams 200 and at their lower ends engage and rest on crosspiece 134. A horizontal cross-beam 208 defines the lower edge of the window area and rests on a pair of short studs 210, one of which abuts against the left-hand stud 206 as viewed in Fig. 14. A pair of plywood strips 212 of different length fit into the lower dadoes in studs 136 and 138 and into suitable dadoes in studs 206 to provide lower tongue 144 and to define the inner wall of lower groove 142.

Figure 16:
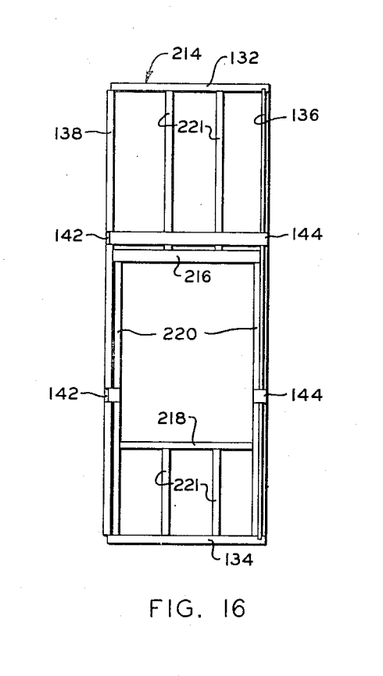
Figs. 16 and 17 are views, like Fig. 5, of still other window-mounting wall panels.

Referring now to Fig. 16, there is shown a panel 214 which provides for a window in side wall 68 and which has a construction generally similar to those previously described. A pair of horizontally spaced cross-beams 216 and a further cross-beam 218, in cooperation with vertical studs 220, define the window-receiving area. Further short studs 221 above and below the window area structurally reinforce the panel.

Figure 17:
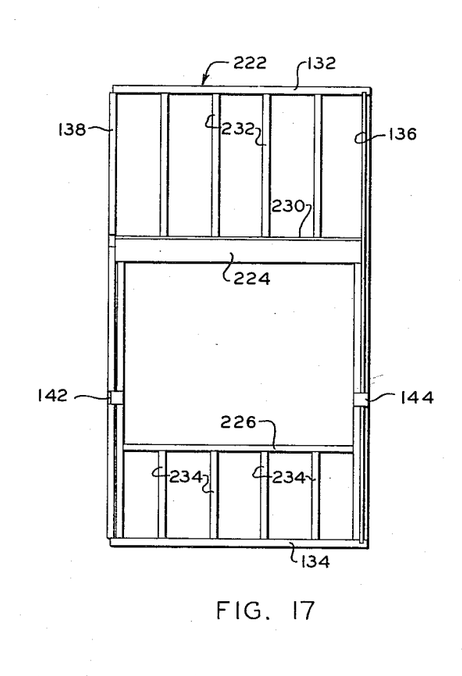

To mount the front fixed sash window 52, a panel 222 (Fig. 17) is employed. The outer frame of panel 222 differs slightly from the preceding panels hereinabove described insofar as no upper tongue 144 is provided. Otherwise, the outer frame is the same general construction as the outer frames of the panels hereinabove described. To mount the frame of the window, there is provided a pair of crossplates 224 at the upper edge of the window area, a single crossbeam 226 at the lower edge of the window area, and a pair of vertical studs 228 which define the side edges of the window area. In this panel it is preferable to secure a plywood strip 230 to the upper edges of crossplates 224 and between said plywood strip and said upper crosspiece 132 there are provided a plurality of short vertical studs 232. A similar supporting structure, comprising vertical studs 234, is provided between crossbeam 226 and lower crosspiece 134.

Figures 18, 19:
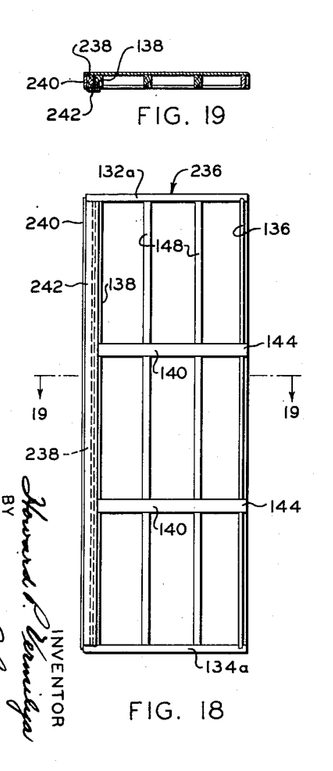
Fig. 18 is a view, like Fig. 5, of a modification of a wall panel of the type shown in Fig. 5, which modification provides a construction suitable for the corner of the outer wall of the dwelling.
Fig. 19 is a sectional view taken substantially along line 19—19 of Fig. 18.

At each of the corners of the dwelling (Fig. 4) one of panels 130 or 130b has the stud 136 thereof abutting one end of a panel 236 (Figs. 18 and 19), which panel 236 is a modification of panel 130. The same vertical stud arrangement 138 and 136 is embodied in panel 236 as in panel 130, as well as the same horizontal plywood strips 140. However, instead of upper and lower crosspieces 132 and 134 there are provided crosspieces 132a and 134a which project beyond stud 138 and which are secured to the upper and lower ends, respectively, of a further stud 238 which parallels stud 138, said stud 238 having a plywood strip 240 secured to the exterior face thereof. A further plywood strip 242 is secured to the interior faces of both of studs 238 and 138 and this plywood strip 242 abuts the stud 136 of the panel which interlocks therewith to form a corner of the dwelling.

These outer wall panels may be easily interconnected at the site of assembly with a minimum of labor to provide the complete vertical outer wall-supporting structure. After the outer wall panels have been assembled as shown in Fig. 4 to provide the outer wall framework, the doors and windows and the auxiliary elements for supporting and securing the same may be mounted within the areas provided therefor in the various panels. The outer wall-covering material may then be secured to plywood sheeting 150 of the panels to complete the wall structure.

Figures 2, 23:
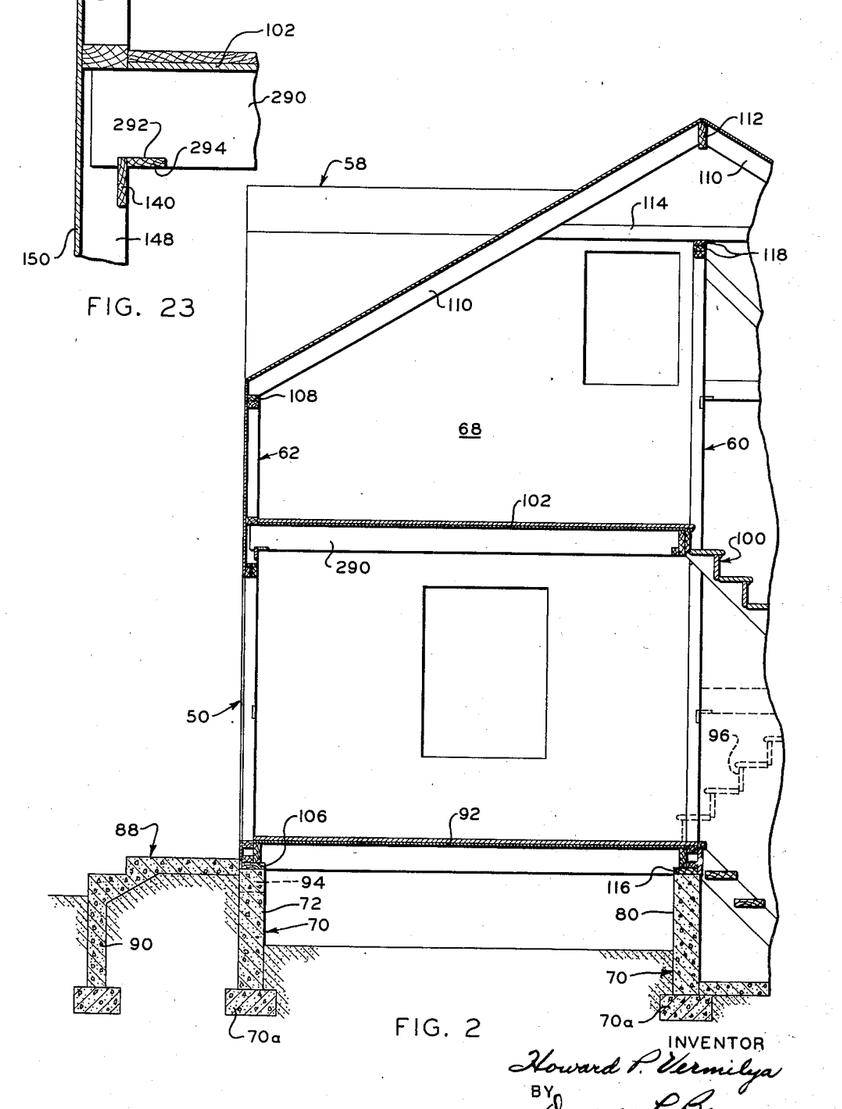
Fig. 2 is a view, partly in section and partly schematic, with parts broken away, of the front or left-hand side of the house as viewed along line 2—2 of Fig. 1 in the direction indicated.
Fig. 23 is a fragmentary, enlarged, sectional view of a portion of the wall construction and illustrates the novel interconnection between studs of the wall panels and the ceiling joists of the first level whereby the attachment of ceiling and wall-covering materials is greatly facilitated, the section being taken substantially along line 23—23 of Fig. 4 and being a section in front of but generally like the corresponding portion of the section of Fig. 2.
Figure 3:
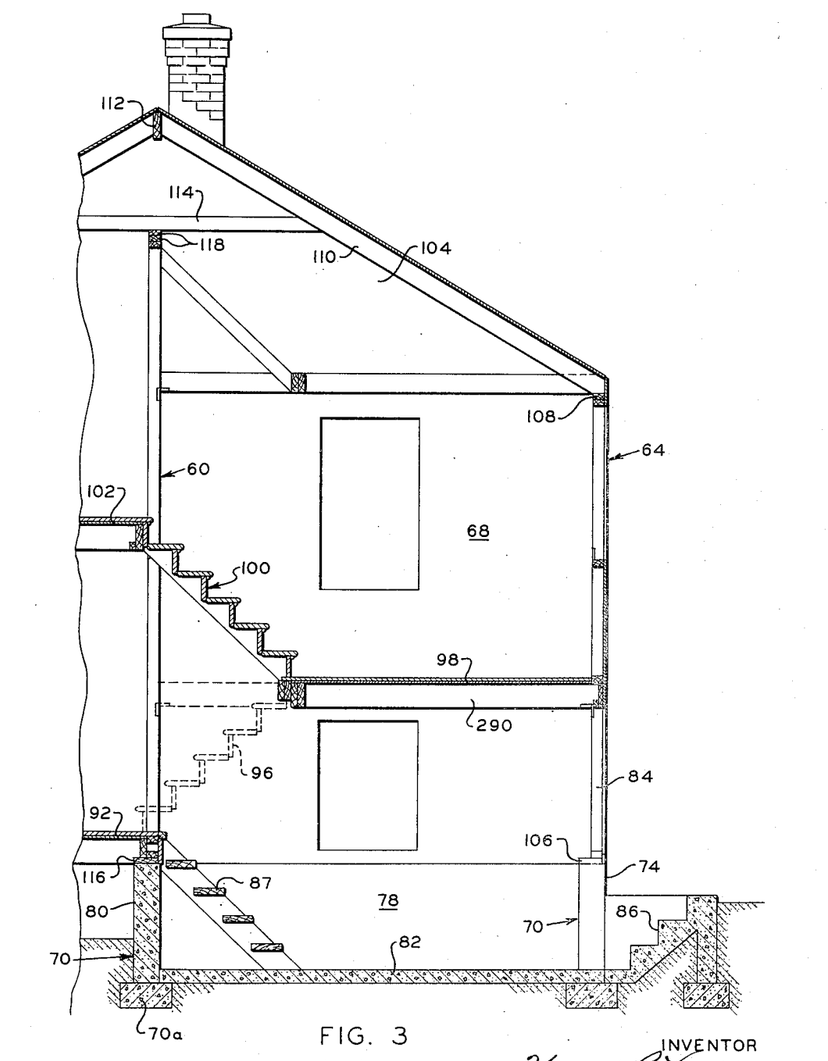
Fig. 3 is a view, partly in section and partly schematic, of the rear or right-hand side of the house, the section also being taken along line 2—2 of Fig. 1 and being viewed in the direction indicated.

To provide the internal, central wall 60, a plurality of novel panels are also employed and each of said panels is, as hereinbefore pointed out, approximately two stories in height, resting on sill 116 and extending upward almost to tie-members 114 (Fig. 2).

Figure 20:
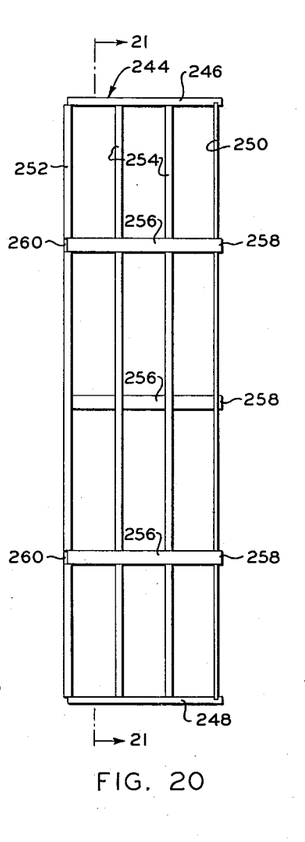
Fig. 20 is a view, like Fig. 5, of a wall panel from which the central wall is formed.
Figure 21:
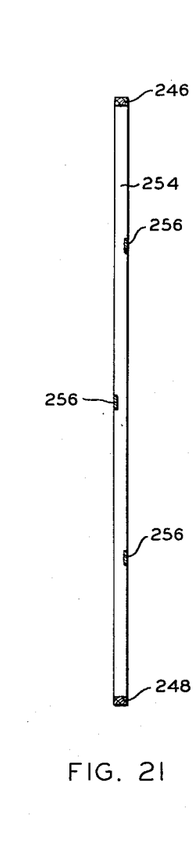
Fig. 21 is a sectional view taken substantially along line 21—21 of Fig. 20.

A typical inner wall panel 244 is shown in Figs. 20 and 21 and comprises an outer frame similar to that of the panel of Fig. 5, said outer frame including upper and lower crosspieces 246 and 248 grooved adjacent one end to receive the thinner vertical stud 250. The thicker vertical stud 252 is secured between the other ends of said crosspieces and projects beyond said ends. One or more internal vertical studs 254 are provided, depending on the width of panel 244. The studs 250, 252 and 254 are dadoed to receive a plurality of plywood strips 256, successive strips being mounted on opposite sides of the studs. As in the previously described panels, plywood strips 256 extend beyond the edge of stud 250 to provide tongues 258 and do not reach the outer edge of studs 252 to define the inner edge of grooves 260.

In the construction illustrated in the drawings, three of panels 244, two of the size shown in Fig. 20 and one, 244a, of a lesser width, provided with only one internal stud 254, are assembled side by side adjacent each of walls 66 and 68.

Figure 22:
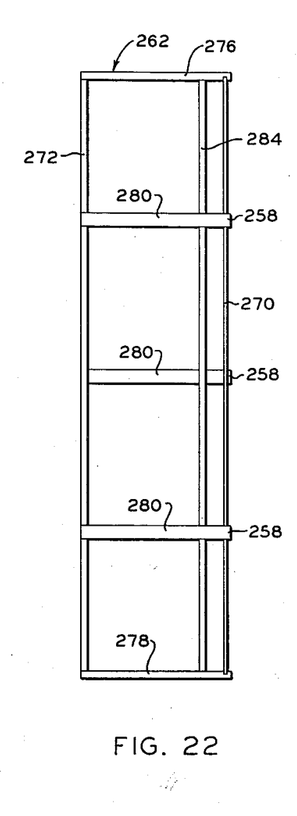
Fig. 22 is a view, similar to Fig. 5, of a modification of the central wall panel of Fig. 20 which provides for the stairway connecting successive levels of the dwelling.

To provide for the staircases between the several levels a pair of panels 262 of modified construction constitute the remaining panels of inner wall 60. A panel 262 is shown in Fig. 22, the right-hand side of said panel, as viewed in said figure, being of the same general construction as the right-hand side of the panel in Fig. 20, and it is stud 270 on this side of each of panels 262 which abuts and interlocks with the adjacent ones of panels 244a. Stud 272, which constitutes the left-hand side of the outer framework of panel 262, instead of having its outer edge spaced from the ends of upper crosspiece 276 and lower crosspiece 278, is flush with the ends of said crosspieces and is also flush with a plurality of plywood strips 280 which extend between said stud 272 and stud 270. Each of strips 280 projects beyond stud 270 to provide tongues 258.

One or more internal studs 284 may be provided but these further studs are so located as to leave a space wide enough for the stairway. When panels 262 are assembled in operative relationship with the remaining panels of the inner wall 60, studs 272 abut one another and tongues 258 overlap the adjacent one of panels 244a.

At the site of assembly, the portions of plywood strips 280 as extend within the stairway area are cut from panel 262.

Upon assembly of the inner and outer wall panels, the upper ends of said panels are provided with plates or beams, including beams 108 and 118 which cooperate to support rafters 110 and tie-members 114, as well as other elements of the roof-supporting structure.

To mount the floors, for example floors 98 and 102 of the second and third level of the dwelling (Figs. 2 and 3), and to provide at the same time the supports for the ceilings of the basement and the first level, a plurality of joists 290 are mounted between the studs of the wall panels and are secured to said studs.

Each of these joists 290 cooperates in a novel manner with one of the plywood strips of the wall panel to which said joist is secured to provide a convenient support for the wall and ceiling coverings. For example, the wall panel 130 (Fig. 5) of front wall 62 has the upper plywood strip 140 thereof located approximately at the ceiling level of the first story (Fig. 23), and this plywood strip cooperates with the lower edge of the joists 290 which are secured to the studs of said panel 130. To achieve this cooperation, each of joists 290 is dadoed adjacent its wall-engaging end, being thus provided with a groove 292 in the lower edge thereof, which groove receives plywood strip 140, said plywood strip abutting one edge of said groove.

A further plywood strip 294 is then secured to joists 290 so that it fits within the remainder of the groove 292 in said joists and preferably said plywood strip 294 extends the length of the wall which it parallels. Since the construction of the panels of the outer wall is such that plywood strips corresponding to plywood strips 140 abut one another to form a continuous surface, said plywood strips, together with strip 294, provide securing means which are flush with the inner surface of the wall and with the lower surface of the ceiling-supporting members, and thereby provide means to which the inner wall and ceiling-covering material may be readily applied. A similar cooperation may exist between joists 290 of floor 98 and the lower plywood strips of the panels of rear wall 64.

It is to be expressly understood that the invention is not limited to the specific construction hereinabove described and that the various modifications of the arrangement and construction of elements shown may be made without departing from the scope of the invention. For example, instead of the plywood strips 294, it is possible to use boards or other continuous strips of material, and the term "structural sheet material" as used herein is intended to include such other materials within its scope. Additionally a beam or girder may be used for part or all of one of the masonry walls of the foundation, particularly as a substitute for a part of the inner wall portion 80.

There is thus provided a novel wall-supporting structure suitable for any dwelling and particularly adapted for a multi-level house. The wall-supporting structure comprises a plurality of wall panels having interlocking outer frames which can be readily interconnected to one another at the site of assembly to provide the inner and outer wall structures and which are equal in length to the height of the wall of which they form a part.

There is also provided a novel arrangement for mounting these wall panels and for securing thereto suitable floor and ceiling-supporting members which cooperate therewith to provide a ready means for attaching inner wall and ceiling-covering materials.

Since certain changes may be made in the above construction and different embodiments of the invention could be made without departing from the scope thereof, it is intended that all matter contained in the above description, or shown in the accompanying drawings, shall be interpreted as illustrative and not in a limiting sense.

What is claimed is:

1. A dwelling comprising a foundation having an outer wall-supporting portion and an inner wall-supporting portion, said inner wall-supporting portion separating said foundation into two substantially equal foundation areas, one of said foundation areas being unfloored and only partly excavated and the other of said foundation areas being provided with a basement floor spaced from the upper edge of said foundation by a distance approximately equal to the height of a half story of said dwelling, a plurality of outer wall panels mounted on said outer wall-supporting portion and connected together to provide a continuous outer wall-supporting structure, a plurality of inner wall panels, each greater in height by approximately one half story than said outer wall panels and mounted on said inner wall-supporting portion and connected together to provide an inner wall, said inner and outer wall-supporting structures having mounted therebetween supporting members for mounting a plurality of floors, said floors being vertically spaced on opposite sides of said inner wall by a distance of approximately a half story.

2. In a multiple-level dwelling, a wall comprising a plurality of wall panels, each said wall panel being equal in height to the height of the wall of which it forms a part and each comprising a sill-engaging lower crosspiece, a roof-supporting crosspiece, two outer studs extending between said crosspieces and provided with grooves and tongues for engaging and interlocking with at least one other panel, and a horizontal strip of structural sheet material extending between said studs intermediate said crosspieces at the level of a ceiling of one of the stories of said dwelling, a plurality of ceiling-supporting joists secured to said studs and provided with grooves for interlocking with said intermediate strips of said panels, and a horizontally extending strip of structural sheet material fitted into said grooves to provide a continuous surface along one edge of the ceiling area to which the ceiling covering may be secured.

3. In a dwelling, a plurality of wall panels comprising vertical studs having grooves formed therein approximately at a ceiling level of a story of said dwelling, horizontal strips of structural sheet material mounted in said grooves flush with the inner vertical faces of said studs, a plurality of ceiling-supporting members secured to said studs and provided with grooves which receive and interlock with the upper edges of said strips, and at least one further strip of structural sheet material extending parallel to said first-named strips and mounted within the grooves in said ceiling-supporting members, said further strip having its lower surface flush with the horizontal faces of said ceiling-supporting members and having an edge thereof abutting the faces of said first-named strips.

4. In a dwelling, a plurality of wall panels comprising vertical studs having grooves formed therein approximately at a ceiling level of a story of said dwelling, horizontal strips of plywood mounted in said grooves flush with the inner vertical faces of said studs, a plurality of ceiling-supporting members secured to said studs and provided with grooves which receive and interlock with the upper edges of said strips, and at least one further strip of plywood extending parallel to said first-named strips and mounted within the grooves in said ceiling-supporting members, said further strip having its lower surface flush with the horizontal faces of said ceiling-supporting members and having an edge thereof abutting the faces of said first-named strips.

5. In a dwelling, outer wall panels, inner wall panels, at least one ceiling-supporting framework including a plurality of joists mounted between said inner and outer wall panels intermediate the ends thereof, a plurality of said wall panels having horizontal strips of structural sheet material flush with the inner surfaces thereof at the level of said ceiling, said joists having grooves therein which receive and interlock with said strips, and a further strip of structural sheet material mounted in said grooves in said joists to extend parallel to said first-named strips, the lower surface of said further strip being flush with the lower edges of said joists to provide a continuous surface along one edge of said ceiling-supporting framework to which the ceiling covering may be secured.

6. In a dwelling, a foundation structure comprising a plurality of outer foundation walls and at least one inner wall-supporting structure, said inner wall-supporting structure extending parallel to two of said outer foundation walls, outer wall panels supported by said two outer foundation walls and connected together to form at least two outer side walls, inner wall panels supported by said inner wall-supporting structure and connected together to form an inner wall substantially parallel to said two outer side walls, a double sloping roof-supporting structure for a gabled roof, said roof-supporting structure having its apex portion substantially directly over said inner wall and having the ends of its sloping portions supported on said side walls, said inner wall extending upwardly approximately a half story higher than said two outer walls, at least one floor-supporting structure for an upper level of said dwelling located on one side only of said inner wall between said inner wall and one of said two outer walls, said floor-supporting structure being spaced from the upper end of said inner wall by a distance of approximately one story, a ceiling-supporting structure located on the opposite side of said inner wall from said floor-supporting structure and spaced above said floor-supporting structure a distance of approximately a half story whereby an upper living space is provided on one side of said inner wall between said floor-supporting structure and said roof-supporting structure and a storage area is provided opposite the upper portion of said living space between said ceiling-supporting structure and said roof-supporting structure, and a basement floor on one side only of said inner wall-supporting structure approximately a half story below the upper ends of said foundation walls.

7. In a dwelling, a foundation structure comprising a plurality of outer foundation walls and at least one inner wall-supporting structure, said inner wall-supporting structure extending parallel to two of said outer foundation walls, outer wall panels supported by said two outer foundation walls and connected together to form at least two outer side walls, inner wall panels supported by said inner wall-supporting structure and connected together to form an inner wall substantially parallel to said two outer side walls, a double sloping roof-supporting structure for a gabled roof, said roof-supporting structure having its apex portion substantially directly over said inner wall and having the ends of its sloping portions supported on said side walls, said inner wall extending upwardly approximately a half story higher than said two outer walls, at least one floor-supporting structure for an upper level of said dwelling located on one side only of said inner wall between said inner wall and one of said two outer walls, said floor-supporting structure being spaced from the upper end of said inner wall by a distance of approximately one story, a ceiling-supporting structure located on the opposite side of said inner wall from said floor-supporting structure and spaced above said floor-supporting structure a distance of approximately a half story whereby an upper living space is provided on one side of said inner wall between said floor-supporting structure and said roof-supporting structure and a storage area is provided opposite the upper portion of said living space between said ceiling-supporting structure and said roof-supporting structure, a basement floor on one side only of said inner wall-supporting structure approximately a half story below the upper ends of said foundation walls, and a second ceiling-supporting structure on the same side of said inner wall as said basement floor and located approximately one story above said basement floor.

8. In a dwelling, a foundation structure comprising a plurality of outer foundation walls and at least one inner wall-supporting structure, said inner wall-supporting structure extending parallel to two of said outer foundation walls, outer wall panels supported by said two outer foundation walls and connected together to form at least two outer side walls, inner wall panels supported by said inner wall-supporting structure and connected together to form an inner wall substantially parallel to said two outer side walls, a double sloping roof-supporting structure for a gabled roof, said roof-supporting structure having its apex portion substantially directly over said inner wall and having the ends of its sloping portions supported on said side walls, said inner wall extending upwardly approximately a half story higher than said two outer walls, at least one floor-supporting structure for an upper level of said dwelling located on one side only of said inner wall between said inner wall and one of said two outer walls, said floor-supporting structure being spaced from the upper end of said inner wall by a distance of approximately one story, a ceiling-supporting structure located on the opposite side of said inner wall from said floor-supporting structure and spaced above said floor-supporting structure a distance of approximately a half story whereby an upper living space is provided on one side of said inner wall between said floor-supporting structure and said roof-supporting structure and a storage area is provided opposite the upper portion of said living space between said ceiling-supporting structure and said roof-supporting structure, a basement floor on one side only of said inner wall-supporting structure approximately a half story below the upper ends of said foundation walls, a second ceiling-supporting structure on the same side of said inner wall as said basement floor and located approximately one story above said basement floor, and a second floor-supporting structure supported directly on one of said two outer foundation walls and on said inner wall-supporting structure on the side of said inner wall opposite said basement floor so as to be approximately a half story above said basement floor.

9. In a dwelling, a foundation structure comprising a plurality of outer foundation walls and at least one inner wall-supporting structure, said inner wall-supporting structure extending parallel to two of said outer foundation walls, outer wall panels supported by said two outer foundation walls and connected together to form at least two outer side walls, inner wall panels supported by said inner wall-supporting structure and connected together to form an inner wall substantially parallel to said two outer side walls, a double sloping roof-supporting structure for a gabled roof, said roof-supporting structure having its apex portion substantially directly over said inner wall and having the ends of its sloping portions supported on said side walls, said inner wall extending upwardly approximately a half story higher than said two outer walls, at least one floor-supporting structure for an upper level of said dwelling located on one side only of said inner wall between said inner wall and one of said two outer walls, said floor-supporting structure being spaced from the upper end of said inner wall by a distance of approximately one story, a ceiling-supporting structure located on the opposite side of said inner wall from said floor-supporting structure and spaced above said floor-supporting structure a distance of approximately a half story whereby an upper living space is provided on one side of said inner wall between said floor-supporting structure and said roof-supporting structure and a storage area is provided opposite the upper portion of said living space between said ceiling-supporting structure and said roof-supporting structure, a basement floor on one side only of said inner wall-supporting structure approximately a half story below the upper ends of said foundation walls, a second ceiling-supporting structure on the same side of said inner wall as said basement floor and located approximately one story above said basement floor, and a second floor-supporting structure supported directly on one of said two outer foundation walls and on said inner wall-supporting structure on the side of said inner wall opposite said basement floor so as to be approximately a half story above said basement floor, said second ceiling-supporting structure being on the same side of said inner wall as said first ceiling-supporting structure and being spaced therefrom by a distance of approximately one story, said second floor-supporting structure being located on the same side of said inner wall as said first floor-supporting structure and spaced therefrom by approximately a single story.

HOWARD P. VERMILYA.

References Cited in the file of this patent

UNITED STATES PATENTS

| Number | Name | Date |
|---|---|---|
| 1,059,417 | Weber | Apr. 22, 1913 |
| 1,697,744 | Winston | Jan. 1, 1929 |
| 1,735,627 | Bates | Nov. 12, 1929 |
| 2,049,733 | Davis | Aug. 4, 1936 |
| 2,129,441 | Otto | Sept. 6, 1938 |
| 2,202,745 | Muse | May 28, 1940 |
| 2,255,315 | Hamilton | Sept. 9, 1941 |
| 2,293,431 | Frease | Aug. 18, 1942 |
| 2,302,101 | Boydstun | Nov. 17, 1942 |
| 2,332,052 | Brent | Oct. 19, 1943 |
| 2,365,579 | Mulligan | Dec. 19, 1944 |
| 2,383,445 | Burrows | Aug. 28, 1945 |
| 2,405,584 | Lewis | Aug. 13, 1946 |

FOREIGN PATENTS

| Number | Country | Date |
|---|---|---|
| 155,857 | Great Britain | Jan. 6, 1921 |
| 192,654 | Great Britain | of 1923 |
| 60,731 | Sweden | Feb. 27, 1923 |

OTHER REFERENCES

Printed Publication-House Construction Details, pages 40 and 63.